(12) United States Patent
Bloss et al.

(10) Patent No.: US 12,155,421 B2
(45) Date of Patent: Nov. 26, 2024

(54) AUGMENTED REALITY SPECTRUM MONITORING SYSTEM

(71) Applicant: Rohde & Schwarz GmbH & Co. KG, Munich (DE)

(72) Inventors: Martin Bloss, Munich (DE); Anugeetha Vishwanatha, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 100 days.

(21) Appl. No.: 17/747,727

(22) Filed: May 18, 2022

(65) Prior Publication Data

US 2023/0379067 A1 Nov. 23, 2023

(51) Int. Cl.
*H04B 17/309* (2015.01)

(52) U.S. Cl.
CPC ................. *H04B 17/309* (2015.01)

(58) Field of Classification Search
CPC .................................................. H04B 17/309
See application file for complete search history.

(56) References Cited

U.S. PATENT DOCUMENTS

| | | | | |
|---|---|---|---|---|
| 8,884,984 B2 * | 11/2014 | Flaks | .................... | G06T 19/006 345/419 |
| 10,039,105 B1 * | 7/2018 | Baeder | ............... | H04W 72/0453 |
| 10,148,368 B1 * | 12/2018 | Wangard | ............... | H04B 17/309 |
| 10,498,375 B1 * | 12/2019 | Bloss | .................... | H04B 1/0458 |
| 10,885,717 B1 * | 1/2021 | Chopra | ................ | H04B 17/391 |
| 10,887,723 B2 * | 1/2021 | Sanderovich | ......... | G01S 5/0247 |
| 11,308,703 B2 * | 4/2022 | Chopra | ................ | H04B 17/309 |
| 11,372,035 B2 * | 6/2022 | Bloss | .................. | G01R 31/2822 |

(Continued)

FOREIGN PATENT DOCUMENTS

| | | | | |
|---|---|---|---|---|
| AU | 2021303411 A1 * | 1/2023 | ............ | B25J 19/023 |
| CN | 108474929 A * | 8/2018 | ......... | G02B 13/0015 |

(Continued)

OTHER PUBLICATIONS

P. Patias, et al, "Robust pose estimation through visual/GNSS mixing," 2016 22nd International Conference on Virtual System & Multimedia (VSMM), Kuala Lumpur, Malaysia, 2016, pp. 1-8, doi: 10.1109/VSMM.2016.7863198. (Year: 2016).*

(Continued)

*Primary Examiner* — Berhanu Tadese
(74) *Attorney, Agent, or Firm* — DITTHAVONG, STEINER & MLOTKOWSKI

(57) ABSTRACT

Disclosed is a portable radio-frequency, RF, spectrum measurement system. The system comprises a first communication interface, a second communication interface, a user interface, and a local processor. The first communication interface comprises an antenna being configured to receive an RF signal to be measured, and is configured to derive waveform data from the received RF signal. The second communication interface is configured to send the waveform data to a remote processor being connectable to the system, and to receive processed spectrum measurement data from the remote processor in turn. The local processor is supplied with the processed spectrum measurement data and configured to visually or acoustically indicate the processed spectrum measurement data on the user interface.

21 Claims, 4 Drawing Sheets

(56) References Cited

U.S. PATENT DOCUMENTS

| | | | | |
|---|---|---|---|---|
| 11,500,468 | B1 * | 11/2022 | Gruben | G06F 3/011 |
| 11,989,276 | B2 * | 5/2024 | Safary | G06Q 40/04 |
| 2012/0092328 | A1 * | 4/2012 | Flaks | G06V 20/10 |
| | | | | 345/419 |
| 2014/0240352 | A1 * | 8/2014 | Kuncl | H04N 21/25841 |
| | | | | 345/633 |
| 2014/0333797 | A1 * | 11/2014 | Kim | G09G 5/02 |
| | | | | 348/223.1 |
| 2019/0305857 | A1 * | 10/2019 | Gallhauser | H04B 17/0085 |
| 2020/0002585 | A1 * | 1/2020 | Power | C08G 18/4841 |
| 2020/0244564 | A1 * | 7/2020 | Naseef | H04W 16/28 |
| 2021/0082201 | A1 * | 3/2021 | Chopra | G06T 11/206 |
| 2021/0151363 | A1 * | 5/2021 | Reiss | H01L 23/043 |
| 2021/0223300 | A1 * | 7/2021 | Huard | G10H 1/04 |
| 2022/0001538 | A1 * | 1/2022 | Smith | G05B 19/18 |
| 2022/0038902 | A1 * | 2/2022 | Mueck | G06F 21/57 |
| 2022/0319123 | A1 * | 10/2022 | Chopra | G06T 11/206 |
| 2023/0007809 | A1 * | 1/2023 | Bloss | H05K 7/20163 |
| 2023/0184832 | A1 * | 6/2023 | Tipton | G01R 31/31901 |
| | | | | 702/117 |
| 2024/0160704 | A1 * | 5/2024 | Albero | G06F 21/16 |

FOREIGN PATENT DOCUMENTS

| | | | | | |
|---|---|---|---|---|---|
| CN | 109997174 | A | * | 7/2019 | A61B 5/0075 |
| CN | 110719116 | A | * | 1/2020 | H04B 1/10 |
| CN | 112235080 | A | * | 1/2021 | H04L 1/0015 |
| CN | 109714781 | B | * | 2/2021 | H04L 1/0026 |
| CN | 112584426 | A | * | 3/2021 | H04W 24/10 |
| CN | 112752288 | A | * | 5/2021 | G06N 20/00 |
| CN | 112788653 | A | * | 5/2021 | H04W 24/10 |
| CN | 113271583 | A | * | 8/2021 | H04W 24/08 |
| CN | 113271685 | A | * | 8/2021 | H04B 7/0413 |
| CN | 113382434 | A | * | 9/2021 | |
| CN | 113382435 | A | * | 9/2021 | |
| CN | 113498096 | A | * | 10/2021 | |
| CN | 114079493 | A | * | 2/2022 | |
| CN | 112235080 | B | * | 3/2022 | H04L 1/0015 |
| CN | 108474929 | B | * | 6/2022 | G02B 13/0015 |
| CN | 113271583 | B | * | 9/2022 | H04W 24/08 |
| CN | 112584426 | B | * | 12/2022 | H04W 24/10 |
| CN | 112788653 | B | * | 2/2023 | H04W 24/10 |
| CN | 113271685 | B | * | 5/2023 | H04B 7/0413 |
| CN | 113382434 | B | * | 11/2023 | |
| DE | 10043894 | A1 * | | 2/2002 | G01R 23/16 |
| DE | 102007007339 | A1 * | | 8/2008 | G01R 31/2803 |
| DE | 102007047138 | A1 * | | 1/2009 | G01R 23/16 |
| DE | 102011080999 | A1 * | | 2/2013 | G01R 23/16 |
| DE | 102012201619 | A1 * | | 8/2013 | G01R 13/0227 |
| DE | 102017100645 | A1 * | | 7/2018 | |
| DE | 102007007339 | B4 * | | 9/2018 | G01R 31/2803 |
| EP | 1305644 | A2 * | | 5/2003 | G01R 23/16 |
| EP | 1305644 | B1 * | | 1/2005 | G01R 23/16 |
| EP | 1701167 | A1 * | | 9/2006 | G01R 29/08 |
| EP | 2015083 | A1 * | | 1/2009 | G01R 23/16 |
| EP | 2199808 | A1 * | | 6/2010 | G01R 13/0227 |
| EP | 1701167 | B1 * | | 10/2016 | G01R 29/08 |
| EP | 3709033 | A1 * | | 9/2020 | |
| EP | 3822760 | A1 * | | 5/2021 | G01R 13/02 |
| EP | 3822761 | A1 * | | 5/2021 | G06F 3/04847 |
| EP | 4002904 | A1 * | | 5/2022 | G06F 21/57 |
| EP | 4039592 | A2 * | | 8/2022 | B64C 39/024 |
| EP | 4039592 | A3 * | | 10/2022 | B64C 39/024 |
| EP | 4093072 | A1 * | | 11/2022 | H04W 24/08 |
| EP | 4213397 | A1 * | | 7/2023 | H04B 1/1036 |
| WO | WO-0211295 | A2 * | | 2/2002 | G01R 23/16 |
| WO | WO-0211295 | A3 * | | 4/2002 | G01R 23/16 |
| WO | WO-2014133272 | A1 * | | 9/2014 | G06T 11/00 |
| WO | WO-2019080485 | A1 * | | 5/2019 | H04L 1/0026 |
| WO | WO-2021051288 | A1 * | | 3/2021 | |
| WO | WO-2021063198 | A1 * | | 4/2021 | H04W 24/10 |
| WO | WO-2021088770 | A1 * | | 5/2021 | H04W 24/10 |
| WO | WO-2021159862 | A1 * | | 8/2021 | H04B 7/0413 |
| WO | WO-2021159863 | A1 * | | 8/2021 | H04W 24/08 |
| WO | WO-2021169378 | A1 * | | 9/2021 | |
| WO | WO-2021169380 | A1 * | | 9/2021 | |
| WO | WO-2021185138 | A1 * | | 9/2021 | |
| WO | WO-2022010944 | A1 * | | 1/2022 | B25J 19/023 |
| WO | WO-2022033456 | A1 * | | 2/2022 | |

OTHER PUBLICATIONS

Patias et al. Robust pose estimation through visual_GNSS mixing, IEEE 2016.*

* cited by examiner

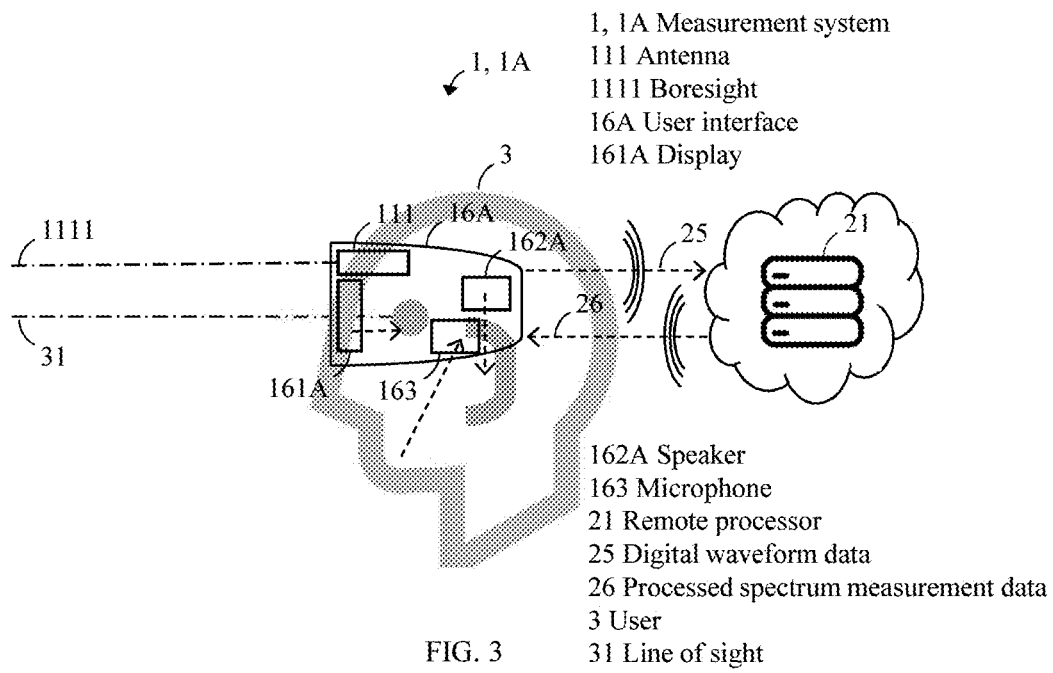

FIG. 3

1, 1A Measurement system
111 Antenna
1111 Boresight
16A User interface
161A Display
162A Speaker
163 Microphone
21 Remote processor
25 Digital waveform data
26 Processed spectrum measurement data
3 User
31 Line of sight

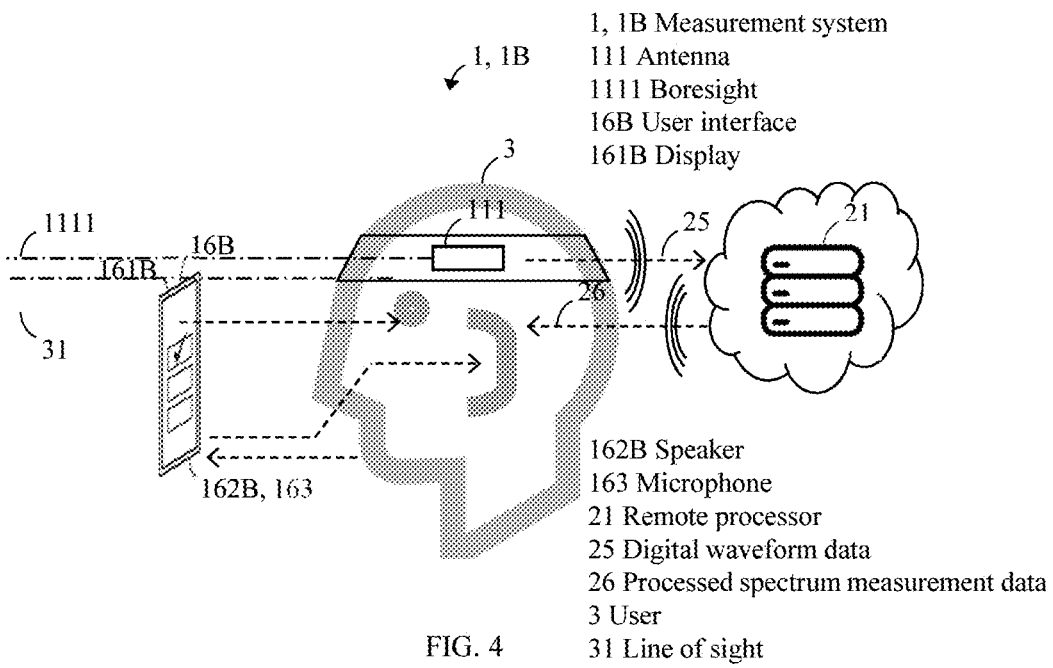

FIG. 4

1, 1B Measurement system
111 Antenna
1111 Boresight
16B User interface
161B Display
162B Speaker
163 Microphone
21 Remote processor
25 Digital waveform data
26 Processed spectrum measurement data
3 User
31 Line of sight

AUGMENTED REALITY SPECTRUM MONITORING SYSTEM

FIELD OF THE INVENTION

The present disclosure relates to radio spectrum monitoring, and in particular to a portable radio-frequency (RF) spectrum measurement system, and a set comprising the same.

BACKGROUND OF THE INVENTION

Portable solutions for radio spectrum monitoring in field operations typically involve rich digital signal processing (DSP) capabilities for real-time frequency transform of a captured RF signal and user interface (UI) components such as a flat screen display for spectrum rendering and a keypad for user input.

US 2020/0025856 A1 pertains to RF detectors that can be worn by the user and that can operate in a hands free fashion. The RF detectors include rich DSP capabilities, and a detection output can be superimposed on the end user field of vision using augmented reality (AR) techniques.

SUMMARY OF THE INVENTION

There is a need to improve a battery lifetime and a handiness of portable radio spectrum monitoring systems.

This is achieved by the embodiments as defined by the appended independent claims. Preferred embodiments are set forth in the dependent claims and in the following description and drawings.

A first aspect of the present disclosure relates to a portable radio-frequency, RF, spectrum measurement system. The system comprises a first communication interface, a second communication interface, a user interface, and a local processor. The first communication interface comprises an antenna being configured to receive an RF signal to be measured, and is configured to derive waveform data from the received RF signal. The second communication interface is configured to send, in particular wirelessly send, the waveform data to a remote processor being connectable to the system, and to receive processed spectrum measurement data from the remote processor in turn. The local processor is supplied with the processed spectrum measurement data and is configured to visually or acoustically indicate the processed spectrum measurement data on the user interface.

According to an implementation, the antenna may comprise a directional antenna or an antenna system comprising a plurality of antennas configured to determine a direction of the received RF signal.

According to an implementation, a boresight of the antenna may be oriented according to a line of sight of the user.

According to an implementation, the waveform data may comprise digital waveform data.

According to an implementation, the digital waveform data may comprise compressed digital waveform data.

According to an implementation, the waveform data may comprise analog waveform data, and the remote processor may be communicatively connectable to the system via an analog-to-digital converter.

According to an implementation, the first communication interface and the antenna may be integrated.

According to an implementation, the second communication interface may comprise one or more of: a light fidelity, Li-Fi, transceiver; a Bluetooth transceiver; a wireless fidelity, Wi-Fi, transceiver; a 5G/NR transceiver; a radio transceiver being configured to use a frequency band not being used by commercial providers; and a transceiver bound to a waveguide, such as a wire, a cable or an optical fiber.

According to an implementation, the processed spectrum measurement data may comprise one or more of: a visual indication relative to the line of sight of the user where to find a source of the received RF signal; an acoustic indication depending on the line of sight of the user where to find the source of the received RF signal; a spectrum of the received RF signal; a spectrogram of the received RF signal; a measure of persistence of the received RF signal; a measure of consistency of the received RF signal with an RF signal recorded previously at a same location; a push notification responsive to a spectral anomaly of the received RF signal; and a classification of the processed spectrum measurement data and/or a source of the received RF signal by the remote processor.

According to an implementation, the visual indication may comprise different colors and/or icons and/or sizes of icons corresponding to different signals and/or signal strengths.

According to an implementation, the system may further comprise one or more of: a global navigation satellite system, GNSS, receiver, configured to derive a location of the system for linking it to the waveform data, and an inertial measurement unit, IMU, configured to derive an orientation of the system for linking it to the waveform data.

According to an implementation, the user interface may comprise one or more of: a head-mounted display, HMD; a peripheral head-mounted display, PHMD; a display of a smart device; a bone conduction transducer, BCT; a speaker of a smart device; and a microphone of a smart device.

According to an implementation, the user interface may be configured to capture a user's classification of the processed spectrum measurement data and/or the source of the received RF signal for linking it to the waveform data.

According to an implementation, the user interface may further be configured to capture a user's selection of the waveform data and/or the processed spectrum measurement data, and the local processor may further be configured to post-process, e.g., filter, the waveform data and/or the processed spectrum measurement data in accordance with the user's selection.

A second aspect of the present disclosure relates to a set, comprising at least one portable RF spectrum measurement system according to the first aspect; and a remote processor communicatively connected to the respective system.

According to an implementation, the remote processor may comprise a cloud server.

According to an implementation, the remote processor may be configured to classify processed spectrum measurement data and/or a source of the received RF signal of the respective portable RF spectrum measurement system in accordance with machine learning based on users' classifications included with the waveform data.

According to an implementation, the at least one portable RF spectrum measurement system may comprise at least two portable RF spectrum measurement systems.

According to an implementation, the remote processor may be configured to receive respective waveform data from the at least two portable RF spectrum measurement systems, and send respective processed spectrum measurement data to at least one of the at least two portable RF spectrum measurement systems.

According to an implementation, the at least two portable RF spectrum measurement systems may respectively be configured to visually or acoustically indicate the at least one processed spectrum measurement data on the user interface of the respective system.

A third aspect of the present disclosure relates to a remote processor, comprising a cloud server being configured to: receive, in particular wirelessly receive, waveform data from at least one portable RF spectrum measurement system, process the received waveform data to obtain processed spectrum measurement data, and send, in particular wirelessly send, the processed spectrum measurement data to the at least one portable RF spectrum measurement system.

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
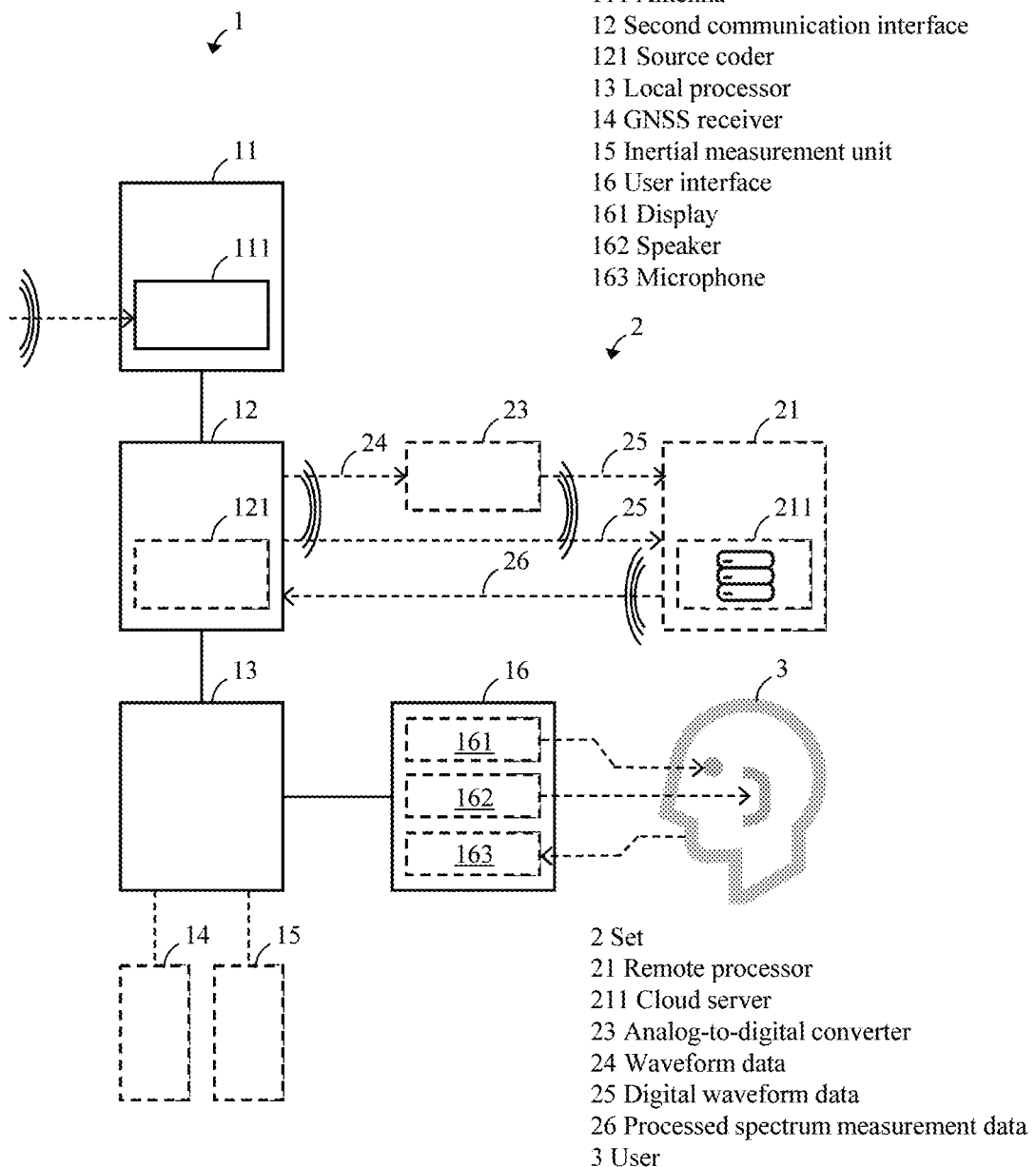

The drawings are to be regarded as being schematic representations, and elements illustrated in the drawings are not necessarily shown to scale. Rather, the various elements are represented such that their function and general purpose become apparent to those skilled in the art.

Figure 2:
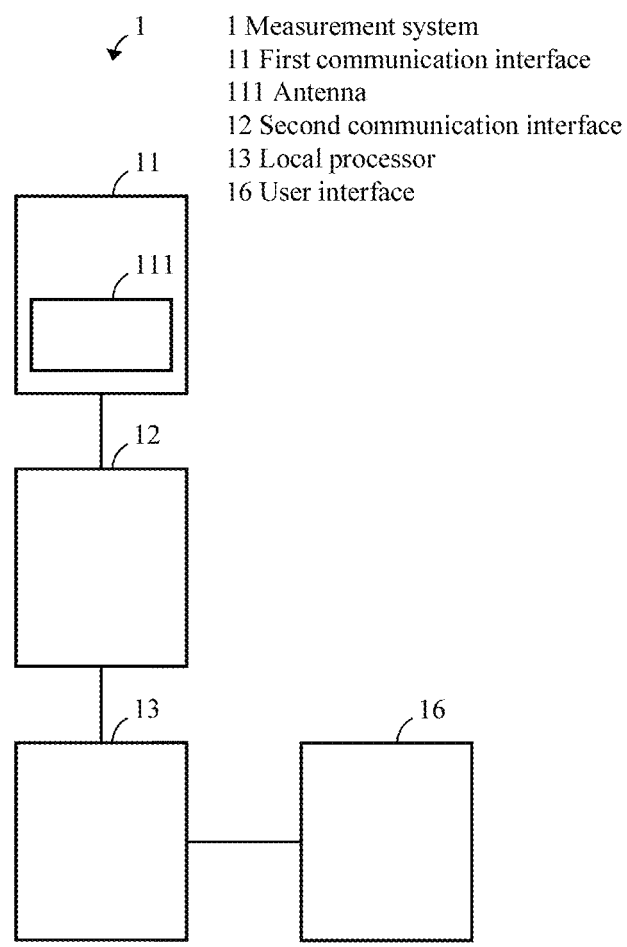
Figure 5:
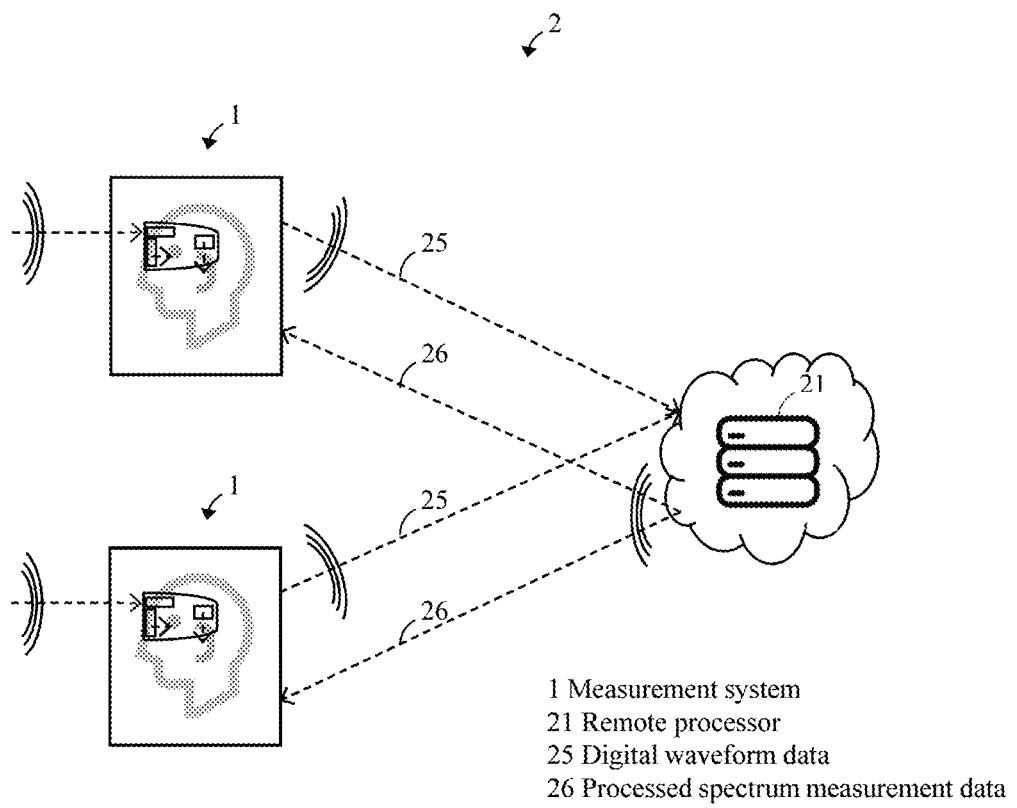

FIG. 1 illustrates a portable RF spectrum measurement system 1 in accordance with the present disclosure;

FIG. 2 illustrates a portable RF spectrum measurement system 1 in accordance with the present disclosure in its most general specification;

FIG. 3 illustrates an implementation of the portable RF spectrum measurement system in accordance with the present disclosure;

FIG. 4 illustrates an alternative implementation of the portable RF spectrum measurement system in accordance with the present disclosure; and FIG. 5 illustrates a set in accordance with the present disclosure comprising a number of portable RF spectrum measurement systems and a remote processor communicatively connected to the respective system.

DETAILED DESCRIPTION OF PREFERRED EMBODIMENTS

FIG. 1 illustrates a portable RF spectrum measurement system 1 in accordance with the present disclosure, comprising a first communication interface 11, a second communication interface 12, a user interface 16, and a local processor 13 (respectively indicated at the left of FIG. 1).

As used herein, a communication interface may refer to a shared boundary across which communication entities may exchange information, and in particular to a telecommunications functionality of the respective communication entity realizing the communication interface on either (i.e., one or the other) side of the same. Examples of said telecommunications functionality comprise a transmitter, a receiver, and a transceiver. As used herein, a transceiver may refer to an electronic circuit combining a transmitter and a receiver.

The first communication interface 11 comprises an antenna 111, in particular a broadband antenna. In particular, the first communication interface 11 and the antenna 111 may be integrated (i.e., incorporated into a single piece, such as on a same printed circuit board).

As used herein, an antenna may generally refer to a waveguide structure designed for conversion between waveguide-bound communication and wireless communication, in both ways. Antennas for radio communication may be omnidirectional or directional, i.e., having a boresight. For example, a directional antenna may comprise a Yagi antenna, a log-periodic antenna, a horn antenna, or the like.

As used herein, an antenna boresight may refer to a direction of a main beam of a directional antenna.

The second communication interface 12 may especially comprise one or more of: a light fidelity, Li-Fi, transceiver; a Bluetooth transceiver; a wireless fidelity, Wi-Fi, transceiver; a 5G/NR transceiver; a radio transceiver, being configured to use a frequency band not being used by commercial providers; and a transceiver bound to a waveguide, such as a wire, a cable or an optical fiber.

As used herein, light fidelity, Li-Fi, may refer to a wireless communication technology which uses the modulation of ultraviolet, infrared or visible light light to communicate data and is not subject to electromagnetic interference (EMI).

As used herein, Bluetooth may refer to a short-range wireless communication technology which uses radio waves in the ISM bands, from 2.402 to 2.48 GHz to communicate data. Bluetooth is standardized by the Bluetooth Special Interest Group.

As used herein, wireless fidelity, Wi-Fi, may refer to a wireless communication technology which uses radio waves in the 2.4 GHZ and 5 GHz bands to communicate data. Wi-Fi is standardized by the Institute of Electrical and Electronics Engineers (IEEE).

As used herein, 5G/NR or New Radio may refer to the wireless communication technology used in the radio access network (RAN) of 5th generation (5G) cellular networks.

Usage of a frequency band not used by commercial providers may facilitate examination of those frequency bands used by the commercial providers.

As used herein, a processor may refer to a central processing unit (CPU), i.e., the hardware within a computer that executes a program, a microprocessor, i.e., an integrated circuit (IC) comprising a CPU, an application-specific integrated circuit (ASIC), i.e., an IC customized for a particular use, a microcontroller, i.e., an IC comprising a small computer, or any other computing infrastructure being configured to execute a program.

FIG. 1 further illustrates a remote processor 21 being connectable to the system 1 (indicated at the right of FIG. 1). In particular, the remote processor 21 may comprise a cloud server 211. As used herein, "remote" may refer to a separation by a communication interface. As such, the remote processor 21 may optionally be arranged locally, e.g., in a backpack of a user 3.

Using the rich computing capabilities of the remote processor 21, e.g. for real-time frequency transform of waveform data of captured RF signals and/or for spectrum analysis, may centralize processing power and power consumption, thus improving a battery lifetime of the portable system 1 and eliminate its limitations in terms of processing capabilities.

FIG. 1 further illustrates a user interface 16 of the system 1, as well as an associated user 3 (indicated at the bottom of FIG. 1).

The user interface 16 may comprise one or more of: a display 161; a speaker 162; and a microphone 163.

A communication between the portable system 1 and the user interface 16 may include wireless communication or wired communication.

As used herein, a display may refer to an output device designed for presenting visual information to a user, and/or to an input device designed for capturing touch gestures from a user in relation to information presented on the output device. For example, the display may comprise a touch-sensitive display.

As used herein, a speaker may refer to an output device designed for communicating acoustic information to a user. For example, the speaker may comprise a conventional electrodynamic sound transducer or a bone conduction transducer, BCT.

As used herein, a transducer may refer to a device being configured to convert energy from one form to another.

As used herein, a microphone may refer to an output device designed for capturing acoustic information from a user.

As used herein, bone conduction may refer to conduction of sound to an inner ear primarily through the bones of a skull.

Using a wearable or detached user interface 16 in connection with the system 1 may make the system 1 much more compact and smaller, improving a handiness of the system 1 and allowing for a hands-free operation and use of the system 1, thereby enhancing ergonomics.

The antenna 111 is configured to receive an RF signal to be measured (indicated at the left of FIG. 1 as a schematic wavefront incident on said antenna 111).

The first communication interface 11 is configured to derive waveform data 24, 25 from the received RF signal.

The waveform data 24, 25 may comprise digital waveform data 25, and in particular compressed digital waveform data 25. For example, this may involve a source coder 121 as a component of the second communication interface 12.

As used herein, digital waveform data may refer to a digital representation of a baseband signal. For example, digital waveform data may comprise digital inphase/quadrature (I/Q) data. As used herein, "digital representation" may refer to sampling of discrete values.

As used herein, data compression or source coding may refer to a process of encoding information using fewer bits than the original representation.

Alternatively, the waveform data 24, 25 may comprise analog waveform data 24, and the remote processor 21 may communicatively be connectable to the system 1 via an analog-to-digital converter 23. For example, the analog-to-digital converter 23 may be arrangeable in a radio range of the system 1, such as in a backpack of the user 3.

As used herein, analog waveform data may refer to an analog representation of a baseband signal. For example, analog waveform data may comprise analog inphase/quadrature (I/Q) data. As used herein, "analog representation" may refer to sampling of non-discrete values of a continuous value range.

As used herein, an analog-to-digital converter (ADC) may refer to a circuit being configured to a continuous-time and continuous-amplitude analog signal to a discrete-time and discrete-amplitude digital signal. For example, an analog-to-digital converter may be implemented as an integrated circuit (IC) in a host computer.

A communication among the second communication interface 12, the analog-to-digital converter 23 and the remote processor 21 may especially include wireless communication (indicated as schematic wavefronts emerging from said entities), as already mentioned in connection with the second communication interface 12. Alternatively, said communication may include conductor-bound communication, such as wire-bound communication.

The system 1 may further comprise one or more of: a global navigation satellite system, GNSS, receiver 14, configured to derive a location of the system 1 for linking it to the waveform data 25; and an inertial measurement unit, IMU 15, configured to derive an orientation of the system 1 for linking it to the waveform data 25.

The second communication interface 12 is configured to send, in particular wirelessly send, the derived waveform data 24, 25, or at least a part of the same, to the remote processor 21 being in communication with the system 1.

The remote processor 21 may be configured to receive the waveform data 25 from the system 1.

The remote processor 21 may further be configured to process the received waveform data 25 to obtain processed spectrum measurement data 26. For example, the remote processor 21 may be configured to perform a real-time frequency transform of the received waveform data 25, such as a Fast Fourier Transform (FFT).

The remote processor 21 may further be configured to send, in particular wirelessly send, processed spectrum measurement data 26 that depends on the received waveform data 25 back to the system 1.

The second communication interface 12 is configured to receive processed spectrum measurement data 26 from the remote processor 21 in turn.

The processed spectrum measurement data 26 may comprise one or more of: a visual indication relative to a line of sight 31 of the user 3 where to find a source of the received RF signal; an acoustic indication depending on the line of sight 31 of the user 3 where to find the source of the received RF signal; a spectrum of the received RF signal; a spectrogram of the received RF signal; a measure of persistence of the received RF signal; a measure of consistency of the received RF signal with an RF signal recorded previously at a same location; a push notification (e.g., an alert message) responsive to a spectral anomaly of the received RF signal; and a classification of the processed spectrum measurement data 26 and/or a source of the received RF signal by the remote processor 21.

As used herein, a spectrum may refer to a visual representation of a distribution of power of a signal into frequency components composing that signal, which distribution may be obtained by Fourier analysis.

As used herein, a spectrogram may refer to a visual representation of the spectrum of a signal as it varies with time.

As used herein, a measure of persistence of a signal may refer to a probability that an emission of the received RF signal occurs with a certain prevalence and/or with a certain periodicity.

As used herein, a measure of consistency of two time series may refer to a cross correlation of these time series. In particular, one of the two time series may comprise waveform data that has previously been recorded in a particular location, and the other one of the two time series may comprise waveform data derived momentarily from the received RF signal in the same location. For example, a user may walk through a factory before an installation and after the installation; a difference (i.e., an inconsistency) can monitored.

As used herein, a classification may refer to a grouping of related items, such as RF signal sources, into classes in accordance with a degree of similarity, such as a degree of similarity of their spectral characteristics.

The local processor 13 is supplied with the processed spectrum measurement data 26 and configured to visually or acoustically indicate the processed spectrum measurement data 26 on the user interface 16.

Any such visual indication may comprise different colors and/or icons and/or sizes of the icons corresponding to different signals and/or signal strengths. In particular, the signals may differ in a type (for example Wi-Fi or Bluetooth) and/or a carrier frequency. For example, the visual indication may comprise an arrow navigation system ("turn left", "turn right") to find a direction of origination of the received RF signal.

The user interface 16 may optionally be configured to post-process the data 26 before indicating it, and to do some trace mathematics. The user interface 16 may further be configured to capture a user's 3 classification of the processed spectrum measurement data 26 and/or a source of the received RF signal for linking it to the waveform data 25.

The user interface 16 may further be configured to capture a user's 3 selection of the waveform data 24, 25 and/or the processed spectrum measurement data 26, and the local processor 13 may further be configured to post-process, e.g., filter, the waveform data 24, 25 and/or the processed spectrum measurement data 26 in accordance with the user's 3 selection. For example, the user interface 16 may also be configured to capture a user's 3 selection of a frequency band that should be surveilled. The local processor 13 may be configured to filter (remove) signals outside that frequency band before sending the waveform data 24, 25 to the remote processor 21 or after the processed spectrum measurement data 26 are received from the remote processor 21. The remote processor 21 could also be configured to filter signals outside that frequency band, given the user's 3 selection is linked to the waveform data 25. As a further example, the user interface 16 may be configured to capture a user's 3 selection of one or more of the different signals being visually indicated on the user interface 16 by respective icons, such as by selecting the one or more signals via the respective icons by eye control or touch gestures.

The remote processor 21 may further be configured to perform machine learning (i.e., training) based on the user's 3 classification included with the waveform data 25, and to henceforth classify the processed spectrum measurement data 26 and/or a source of the received RF signal on its own in accordance with the performed machine learning (i.e., ultimately based on the user's 3 classification included with the waveform data 25). Alternatively, the remote processor 21 may further be configured to establish an expert system based on the user's 3 classification included with the waveform data 25 for similar purposes.

As used herein, machine learning may refer to computer algorithms being configured to learn from data provided so that they carry out certain tasks, such as a classification, for example. For instance, machine learning may involve supervised learning of an artificial neural network based on training data (e.g., the processed spectrum measurement data 26 of the waveform data of an underlying RF signal) that is labeled in terms of a desired mapping result (e.g., a class of RF signal source of the underlying RF signal).

As a result of machine learning (or establishing an expert system), the portable system 1 may informs the user 3 of the result of the classification. For example, that the spectrum matches a broken circuit of a transformer.

FIG. 2 illustrates a portable RF spectrum measurement system 1 in accordance with the present disclosure in its most generic specification (i.e., the combination of features indicated in FIG. 1 by solid lines).

FIG. 3 illustrates an implementation of the portable RF spectrum measurement system 1, 1A in accordance with the present disclosure.

The illustration of FIG. 3 features only key elements of the system 1, 1A for the sake of clarity.

The system 1, 1A is shown as being mounted on a head of the user 3.

In this particular implementation, the user interface 16, 16A may form part of an augmented reality system, and may comprise one or more of: a head-mounted display, HMD 161A; a peripheral head-mounted display, PHMD; a bone conduction transducer, BCT 162A; a hollow lens (not shown) and a microphone 163. The display 161A may especially be arranged in a line of sight 31 of the user 3, irrespective of the particular choice of the display 161A.

As illustrated, the user interface 16, 16A may carry the antenna 111 of the system 1, 1A, which antenna 111 may particularly comprise a directional antenna or a direction finding system, i.e., an antenna system comprising a plurality of antennas configured to determine a direction of the received RF signal. A boresight 1111 of the antenna 111 may be oriented according to the line of sight 31 of the user 3. As such, the antenna 111 is configured to consistently receive the RF signal from the direction of the line of sight 31 of the user 3.

The first communication interface 11 of the system 1, 1A is configured to derive waveform data 24, 25 from the RF signal received by the antenna 111.

The second communication interface 12 of the system 1, 1A is configured to send, in particular wirelessly send, the waveform data 24, 25 to the remote processor 21 being in communication with the system 1, 1A.

The remote processor 21 may be configured to receive the waveform data 25 from the system 1, 1A, and to send processed spectrum measurement data 26 to the system 1, 1A.

The second communication interface 12 of the system 1, 1A is configured to receive, in particular wirelessly receive, the processed spectrum measurement data 26 from the remote processor 21 in turn.

The local processor 13 of the system 1, 1A is supplied with the processed spectrum measurement data 26 and configured to visually indicate (see arrow from display 161, 161A to an eye of the user 3) or acoustically indicate (see arrow from the speaker 162, 162A to an ear of the user 3) the processed spectrum measurement data 26 on the user interface 16.

The user interface 16, 16B may further be configured to capture the user's 3 classification of the processed spectrum measurement data 26 and/or the source of the received RF signal for linking it to the waveform data 25. For example, if the user 3 recognizes a particular spectral anomaly or peculiarity in the processed spectrum measurement data 26, he or she may express a corresponding classification acoustically, which may be captured by the microphone 163 for linking it to the waveform data 25.

The remote processor 21 may be configured to perform machine learning based on the user's 3 classification included with the waveform data 25, and to henceforth classify processed spectrum measurement data 26 and/or a source of the received RF signal in accordance with said machine learning centrally and automatically.

FIG. 4 illustrates an alternative implementation of the portable RF spectrum measurement system 1, 1B in accordance with the present disclosure.

Similar to FIG. 3, the illustration of FIG. 4 features only key elements of the system 1, 1B for the sake of clarity.

The system 1, 1B is again shown as being mounted on the head of the user 3.

In this particular implementation, the user interface 16, 16B may form part of a smart device, and may comprise one or more of: a display 161B; a speaker 162B; and a microphone 163. The display 161B may especially be arranged in or close to the line of sight 31 of the user 3.

As used herein, a smart device may refer to a portable or handheld electronic equipment having wireless and/or wirebound communication functionality, such as a smartphone or phablet, a mobile computer such as a personal digital assistant, tablet computer or laptop computer, a wearable computer such as a smart watch, a measurement device, or the like.

As illustrated, the user 3 may carry the antenna 111 of the system 1, 1B separately from the user interface 16, 16B. For example, the antenna 111 may be worn by the user 3 using a headband or other hands-free mounting means. The antenna 111 may especially comprise a directional antenna or an antenna system comprising a plurality of antennas configured to determine a direction of the received RF signal. A boresight 1111 of the antenna 111 may again be oriented according to the line of sight 31 of the user 3. The antenna 111 is therefore configured to consistently receive the RF signal from the direction of the line of sight 31 of the user 3.

The first communication interface 11 of the system 1, 1B is configured to derive waveform data 24, 25 from the RF signal received by the antenna 111.

The second communication interface 12 of the system 1, 1B is configured to send, in particular wirelessly send, the waveform data 24, 25 to the remote processor 21 being in communication with the system 1, 1B.

The remote processor 21 may be configured to receive, in particular wirelessly receive, the waveform data 25 from the system 1, 1B, and to send processed spectrum measurement data 26 to the system 1, 1B.

The second communication interface 12 of the system 1, 1B is configured to receive, in particular wirelessly receive, the processed spectrum measurement data 26 from the remote processor 21 in turn.

The local processor 13 of the system 1, 1B is supplied with the processed spectrum measurement data 26 and configured to visually indicate (see arrow from display 161, 161B to an eye of the user 3) or acoustically indicate (see arrow from the speaker 162, 162B to an ear of the user 3) the processed spectrum measurement data 26 on the user interface 16.

The user interface 16, 16B may further be configured to capture the user's 3 classification of the processed spectrum measurement data 26 and/or the source of the received RF signal for linking it to the waveform data 25. For example, if the user 3 recognizes a particular spectral anomaly or peculiarity in the processed spectrum measurement data 26, he or she may express a corresponding classification acoustically which may be captured by the microphone 163 for linking it to the waveform data 25. This allows for hands-free operation of the system 1 via voice command support. Optionally, the user 3 may express a corresponding classification by choosing one of a number of available options (see indicated check mark in the display 161B) displayed on a touch-sensitive display 161B of the user interface 16, 16B of the smart device. This allows for operation of the system 1 via gesture support.

This way, the remote processor 21 may be configured to perform machine learning based on the user's 3 classification included with the waveform data 25, and to henceforth classify processed spectrum measurement data 26 and/or a source of the received RF signal in accordance with said machine learning centrally and automatically.

FIG. 5 illustrates a set 2 comprising a number of portable RF spectrum measurement systems 1 and a remote processor 21 communicatively connected to the respective system, in accordance with the present disclosure.

The set 2 comprises at least one portable RF spectrum measurement system 1 as previously described, and a remote processor 21 communicatively connected to the respective system 1.

According to the particular implementation of FIG. 5, the set 2 may comprise at least two portable RF spectrum measurement systems 1, 1A, 1B.

The remote processor 21 of the set 2 may be configured to receive respective waveform data 25 from the at least two portable RF spectrum measurement systems 1, 1A, 1B, and to send respective processed spectrum measurement data 26 to at least one of the at least two portable RF spectrum measurement systems 1, 1A, 1B. In other words, if communication cirumstances permit, the at least two portable RF spectrum measurement systems 1, 1A, 1B may not only receive processed spectrum measurement data 26 relating to their own waveform data 24, 25 but as well processed spectrum measurement data 26 relating to waveform data 24, 25 of other systems 1 of the at least two portable RF spectrum measurement systems 1, 1A, 1B. For example, the remote processor 21 may process waveform data from user A and send processed spectrum measurement data 26 to user B. The user interface 16 of user B may then display the processed spectrum measurement data 26 (cooperative mode). Similar considerations apply for a surveillance station within the radio range.

Having at least two portable systems 1, 1A, 1B may facilitate collaborative/cooperative radio spectrum monitoring/hunting by the at least two portable RF spectrum measurement systems 1, 1A, 1B which are spaced apart, in that respective lines of sight 31 may be combined for locating a common source of the respectively received RF signal. In addition, a better usage of the remote processor 21 may be achieved.

The at least two portable RF spectrum measurement systems 1A, 1B may respectively be configured to visually or acoustically indicate the at least one processed spectrum measurement data 26 on the user interface 16, 16A, 16B of the respective system 1.

The respective user interface 16 may further be configured to capture the respective user's 3 classification of the processed spectrum measurement data 26 and/or the source of the received RF signal for linking it to the waveform data 25. For example, if the respective user 3 recognizes a particular spectral anomaly or peculiarity in the processed spectrum measurement data 26, he or she may express a corresponding classification acoustically, which may be captured by the microphone 163 for linking it to the waveform data 24, 25. This allows for hands-free operation of the system 1 via voice command support.

The remote processor 21 may then be configured to perform machine learning based on all the users' 3 previous classifications included with the respective waveform data 25, and to henceforth classify processed spectrum measurement data 26 and/or a source of the received RF signal in accordance with said machine learning centrally and automatically. A goal is that a similar spectrum recorded at a different place at a different time by a different user should result in a same classification. For example, user A records a spectrum S and identifies it as a router. User B records a similar spectrum S' hundreds of kilometers away. The remote processor 21 may automatically classify it as a router. In that case user B can look for a router and can find the router even faster.

Using labeled training data from at least two users 3 in a machine learning/training phase may speed up and improve a quality of the machine learning.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

Although the present disclosure has been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired and advantageous for any given or particular application. The phrase 'at least one of A and B' may stand for "and/or".

What is claimed is:

1. A portable radio-frequency, RF, spectrum measurement system, comprising
    a first communication interface,
        comprising an antenna, being configured to receive an RF signal to be measured, and
        being configured to derive waveform data from the received RF signal;
    a second communication interface,
        being configured to send the waveform data to a remote processor being connectable to the system, and
        receive processed spectrum measurement data from the remote processor in turn;
    a user interface; and
    a local processor,
        supplied with the processed spectrum measurement data and
        being configured to visually or acoustically indicate the processed spectrum measurement data on the user interface,
        wherein the processed spectrum measurement data comprises one or more of a measure of persistence of the received RF signal, a measure of consistency of the received RF signal with an RF signal recorded previously at a same location, and a push notification responsive to a spectral anomaly of the received RF signal.

2. The system of claim 1, wherein the antenna comprises a directional antenna; or wherein the system further comprises an antenna system comprising a plurality of antennas configured to determine a direction of the received RF signal.

3. The system of claim 2, further comprising a boresight of the antenna being oriented according to a line of sight of the user.

4. The system of claim 1, wherein the waveform data comprises digital waveform data.

5. The system of claim 4, wherein the digital waveform data comprises compressed digital waveform data.

6. The system of claim 1, wherein the waveform data comprises analog waveform data, and wherein the remote processor is communicatively connectable to the system via an analog-to-digital converter.

7. The system of claim 1, wherein the first communication interface and the antenna are integrated.

8. The system of claim 1, wherein the second communication interface comprises one or more of:
    a light fidelity, Li-Fi, transceiver,
    a Bluetooth transceiver,
    a wireless fidelity, Wi-Fi, transceiver,
    a 5G/NR transceiver,
    a radio transceiver, being configured to use a frequency band not being used by commercial providers, and
    a transceiver bound to a waveguide.

9. The system of claim 1, wherein the processed spectrum measurement data comprises one or more of:
    a visual indication relative to the line of sight of the user where to find a source of the received RF signal,
    an acoustic indication depending on the line of sight of the user where to find the source of the received RF signal,
    a spectrum of the received RF signal,
    a spectrogram of the received RF signal,
    a classification of the processed spectrum measurement data and/or a source of the received RF signal by the remote processor.

10. The system of claim 9, wherein the visual indication comprises different colors and/or icons and/or sizes of an icon corresponding to different signals and/or signal strengths.

11. The system of claim 1, further comprising one or more of:
    a global navigation satellite system, GNSS, receiver, configured to derive a location of the system for linking it to the waveform data, and
    an inertial measurement unit, IMU, configured to derive an orientation of the system for linking it to the waveform data.

12. The system of claim 1, wherein the user interface comprises one or more of:
    a head-mounted display, HMD,
    a peripheral head-mounted display, PHMD,
    a display of a smart device,
    a bone conduction transducer, BCT,
    a speaker of a smart device, and
    a microphone of a smart device.

13. The system of claim 1, wherein the user interface is configured to capture a user's classification of the processed spectrum measurement data and/or the source of the received RF signal for linking it to the waveform data.

14. The system of claim 1, wherein the user interface is further configured to capture a user's selection of the waveform data and/or the processed spectrum measurement data, and wherein the local processor is further configured to post-process the waveform data and/or the processed spectrum measurement data in accordance with the user's selection.

15. A set, comprising
    at least one portable RF spectrum measurement system according to claim 1; and
    a remote processor communicatively connected to the respective system.

16. The set of claim 15, wherein the remote processor comprises a cloud server.

17. The set of claim 15, wherein the remote processor is configured to classify processed spectrum measurement data and/or a source of the received RF signal of the respective portable RF spectrum measurement system in accordance with machine learning based on users' classifications included with the waveform data.

18. The set of claim 15, wherein the at least one portable RF spectrum measurement system comprises at least two portable RF spectrum measurement systems.

19. The set of claim 18, wherein the remote processor is configured to receive respective waveform data from the at least two portable RF spectrum measurement systems, and send respective processed spectrum measurement data to at least one of the at least two portable RF spectrum measurement systems.

20. The set of claim 19, wherein the at least two portable RF spectrum measurement systems respectively are configured to visually or acoustically indicate the at least one processed spectrum measurement data on the user interface of the respective system.

21. A remote processor, comprising
a cloud server, being configured to
  receive waveform data from at least one portable RF spectrum measurement system,
  process the received waveform data to obtain processed spectrum measurement data, and
  send the processed spectrum measurement data to the at least one portable RF spectrum measurement system,
wherein the processed spectrum measurement data comprises one or more of a measure of persistence of the received RF signal, a measure of consistency of the received RF signal with an RF signal recorded previously at a same location, and a push notification responsive to a spectral anomaly of the received RF signal.

\* \* \* \* \*